June 4, 1940.   A. E. SCHUBERT   2,203,658
LENS SHIFTING AND FOCUSING MECHANISM
Filed March 9, 1938   3 Sheets-Sheet 1

Alvin E. Schubert
INVENTOR

BY
ATTORNEYS

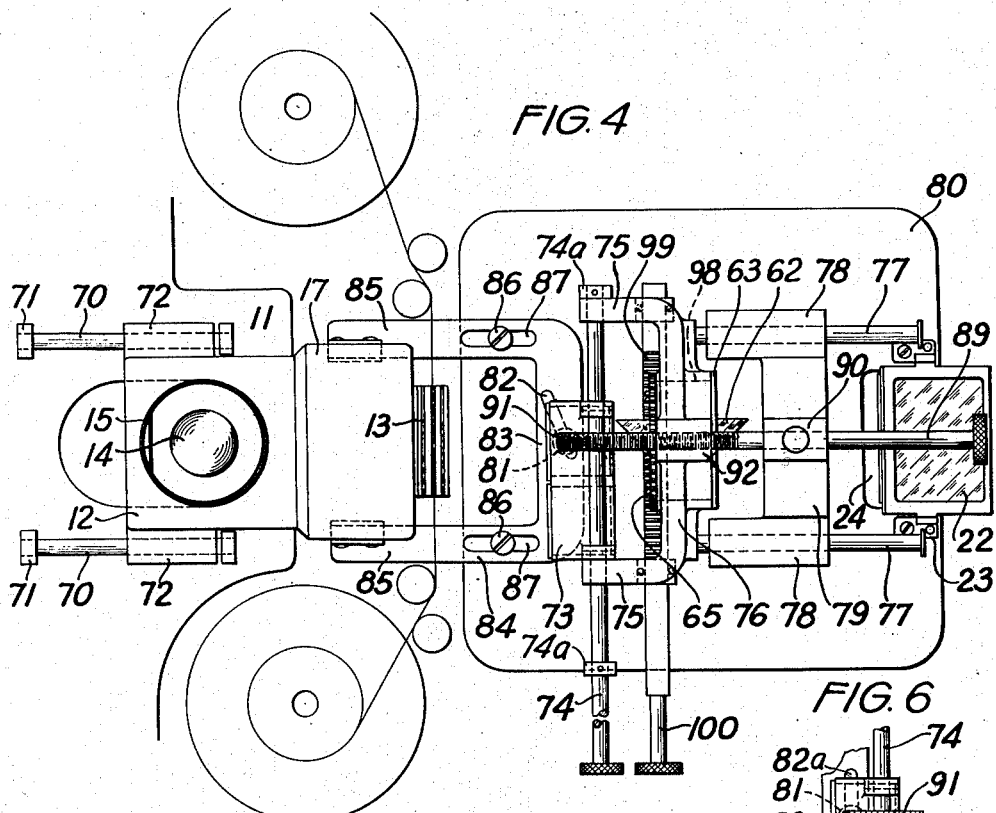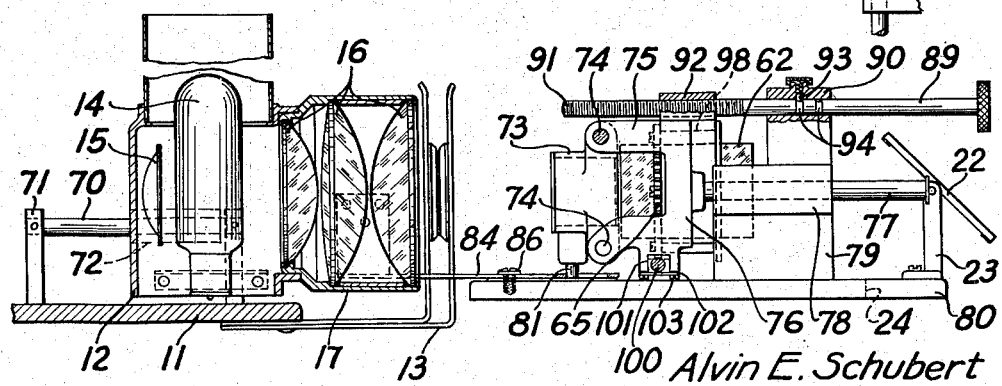

June 4, 1940.  A. E. SCHUBERT  2,203,658
LENS SHIFTING AND FOCUSING MECHANISM
Filed March 9, 1938  3 Sheets-Sheet 3
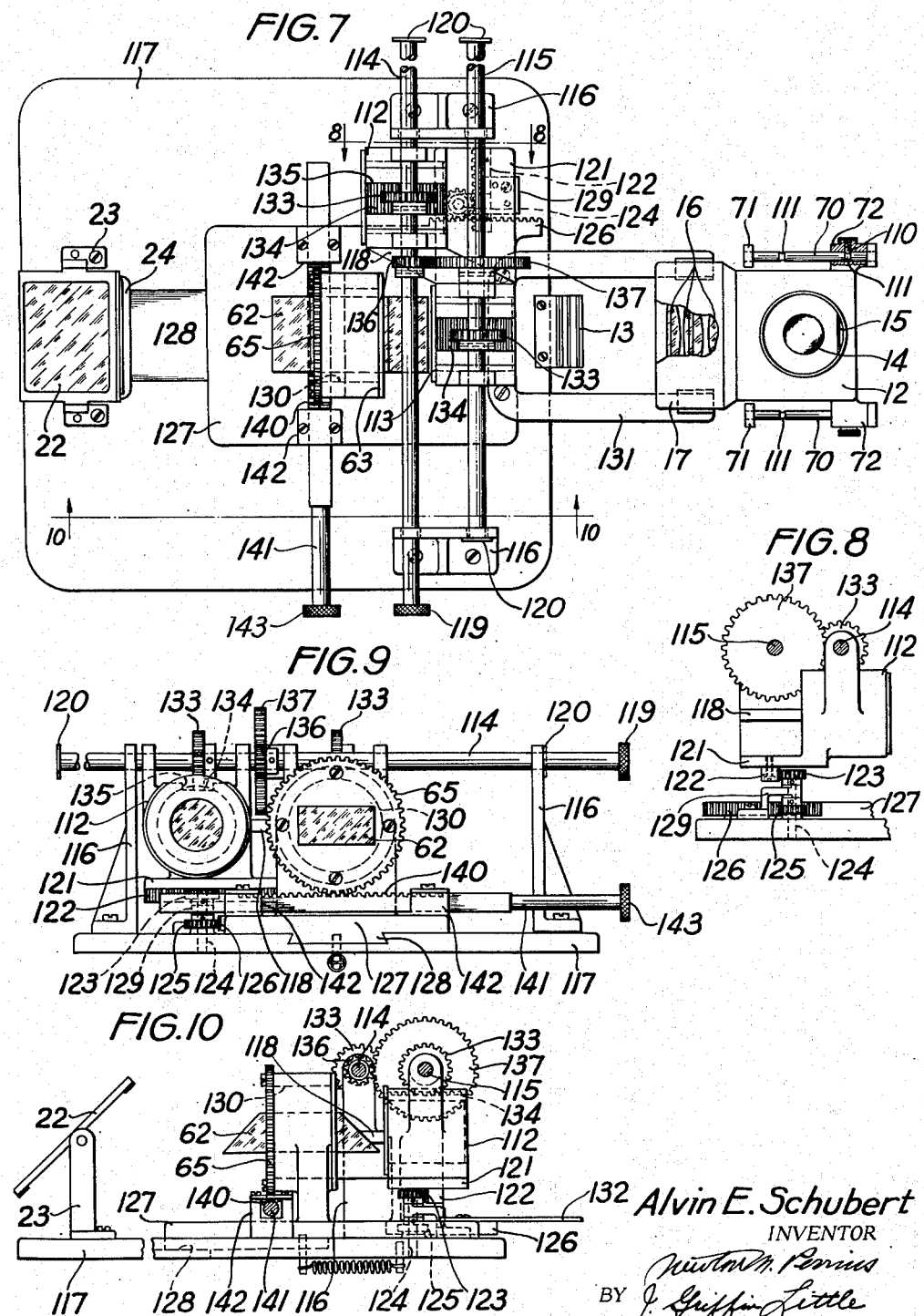
Alvin E. Schubert
INVENTOR
BY
ATTORNEYS Patented June 4, 1940

2,203,658

UNITED STATES PATENT OFFICE 2,203,658

LENS SHIFTING AND FOCUSING MECHANISM

Alvin E. Schubert, Rochester, N. Y., assignor to Eastman Kodak Company, Rochester, N. Y., a corporation of New Jersey Application March 9, 1938, Serial No. 194,898

20 Claims. (Cl. 88—24)

The present invention relates to a viewing apparatus, and more particularly to a lens shifting and focusing mechanism therefor. This mechanism is particularly intended for use with a viewing device of the general type shown and described in the patent to R. S. Hopkins, Number 2,008,982, issued July 23, 1935. It is contemplated, however, that various other forms of viewing devices may be used without departing from the spirit of the invention and the scope of the appended claims.

One object of the invention is the provision in an apparatus of the kind described of a lens mount provided with a plurality of projection lenses of different focal lengths, the lenses being selectively movable to projecting position to vary the magnification of the image which is projected onto the viewing screen.

Another object of the invention is the provision in such an apparatus of an arrangement for simultaneously adjusting and focusing all of the optical members of the apparatus relative to the film gate.

A further object of the invention is the provision of an adjustable prism which may be rotated to adjust the position of the projected image on the viewing screen.

Still another object of the invention is the provision of an arrangement for simultaneously moving the desired projection lens into projecting position, and focusing all the optical members of the apparatus.

A still further object of the invention is the provision of a lens shifting and focusing arrangement which is positive in its action, automatically focuses the positioned lenses, and is readily changeable to bring another projection lens into position.

Yet another object of the invention is the provision of a single condenser lens unit which is adapted to be used with a plurality of projecting lenses of different focal lengths.

To these and other ends, the invention resides in certain improvements and combinations of parts, all as will be hereinafter more fully described, the novel features being pointed out in the claims at the end of the specification.

In the drawings:

Fig. 4 is a plan view of a modified form of lens shifting and focusing mechanism, showing the arrangement of the various parts;

Fig. 5 is a side elevation view of a mechanism illustrated in Fig. 4, with parts in section, showing the arrangement by which all of the optical members are focused at one time;

Fig. 6 is a fragmentary view of a portion of the mechanism illustrated in Fig. 4, showing one arrangement for connecting the lamphouse to the lens mount;

Fig. 7 is a plan view of still another modification of a lens shifting and focusing mechanism constructed in accordance with the present invention;

Fig. 8 is a vertical sectional view taken substantially on the line 8—8 of Fig. 7, showing the mechanism for shifting the prism mount upon the movement of the lens mount to bring the proper projection lens into projecting position;

Fig. 9 is an end view of the mechanism illustrated in Fig. 7, as taken from the left thereof, showing the lens and prism mounts, and the mechanism for simultaneously shifting these mounts;

Fig. 10 is a vertical sectional view taken substantially on the line 10—10 of Fig. 7, showing the arrangement by which slight adjustments of the projection lenses are secured.

Similar reference numerals throughout the various views indicate the same parts.

The present invention relates to a lens shifting and focusing mechanism which is primarily designed for use in a machine or apparatus for enlarging small areas of printed matter which have been recorded on miniature film. A machine of this general type is shown and described in the patent to R. S. Hopkins, #2,008,982, issued July 23, 1935. This patent shows a housing or cabinet the bottom of which forms a viewing screen, while the top supports the various optical members and light source. Reference may be had to this patent for more detailed description.

The present embodiment of the invention comprises, in general, a lens mount in which a plurality of projection lenses of different focal lengths are mounted. This mount is movable to bring the desired projection lens into projecting position, and is operatively connected to a unitary lamphouse and condenser lens assembly so that when the positioned projection lens is moved relative to the film gate, the light source and the condensing lenses are also simultaneously moved relative to the gate the proper distances to focus the image of the film strip on the viewing screen. The focusing of the projection lens may be accomplished simultaneously with, or subsequent to, the moving of the desired lens into projecting position. A suitable prism is also operatively connected to and movable as a unit with the lens mount. By rotating the prism, the image on the viewing screen may be turned to reading position. Both mechanisms are mountd on the top of the cabinet, not shown, in a manner to be hereinafter more fully described.

Figure 1:
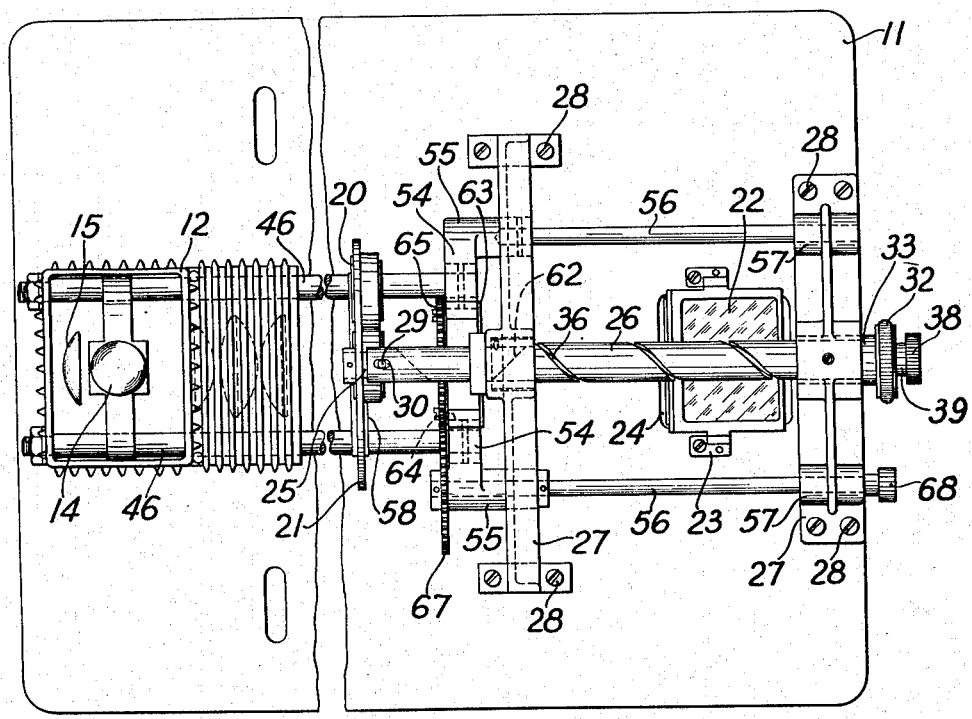
Fig. 1 is a plan view, with the top of the lamp-house removed, of a lens shifting and focusing mechanism constructed in accordance with one embodiment of the invention, showing the relation of the various parts.

Fig. 1 shows a plate member or support 11 which may be secured in any suitable or well-known manner to the top of the cabinet, not shown. A lamphouse 12, of any desired construction, is positioned on one side of the film gate 13 and is slidably mounted on the member 11 in a manner to be later described. The lamp 14 and the reflector 15 also of any well-known construction, are positioned within the lamphouse. One or more condenser lenses, generally indicated by the numeral 16, are positioned intermediate the lamp 14 and the gate 13, and on the optical axis thereof, as is well known. These condenser lenses are mounted in a suitable housing 17 which is preferably formed integral with the lamphouse 12. By means of this arrangement the lamp 14 and the lenses 16 may be moved as a unit relative to the gate 13, for reasons to be later described.

Figure 2:
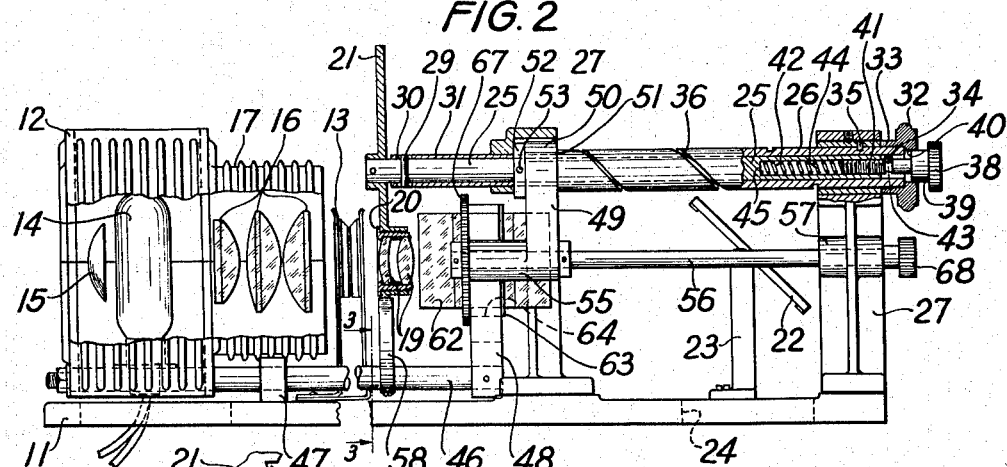
Fig. 2 is a side elevation view of the mechanism illustrated in Fig. 1, with parts in section and parts broken away, showing the mechanism by which the proper projection lens is moved into position and the optical members are simultaneously focused.

The filament image of the lamp 12 is focused, by reason of the position of the condenser lenses 16, in one of the projection lenses 19 which are mounted in bosses 20 on a disk or lense mount 21. These lenses 19 are of different focal lengths, and may be selectively brought into projecting position by rotating the mount 21, in a manner to be later described. These lenses 19 project the film image onto an inclined mirror 22 mounted on a support 23 secured to the plate 11. The image is then reflected by the mirror 22, through an opening 24 onto a suitable viewing screen which may constitute the bottom of the cabinet, as shown in the above-mentioned patent to Hopkins. When, however, only a section of the film image is of interest, or greater magnification is desired, a shorter focal length lens is moved into position, as shown in Fig. 2 and later described.

When the shorter focal length lens 19 is used, only about one-fourth of the image area of the film strip lies within the field of the projection lens. In order that the entire image may be viewed, with this short focal length lens, it is necessary to move the film gate relative to and across the axis of the optical system so that various portions of the film image may be successively brought into projecting position. This movement of the film relative to the optical axis is known as scanning. Any suitable means, such as shown and described in the applicant's copending application Number 167,749, filed October 20, 1937, and which has become Patent No. 2,165,419, dated July 11, 1939, may be used for moving the gate for the purposes of scanning. As the scanning mechanism does not constitute a part of the present invention, a further description is not deemed necessary.

When, however, the entire image on the film strip is to be viewed on the viewing screen, the longer focal length lens 19 is moved into projecting position so that the entire image area of the film strip lies within the field of the longer focal length lens 19. Proper focus of this longer focal length lens is secured by moving it away from the gate 13, and moving the lamphouse 12 and condenser lens assembly 16 toward the gate. These members are preferably moved as a unit, in a manner to be later described. By means of such an arrangement a single condenser lens unit may be used with the two projecting lenses 19 of different focal lengths.

The lens mount 21 is mounted on one end of a shaft 25 which is positioned within a tubular member, generally indicated by the numeral 26, journalled in spaced U-shaped brackets 27 secured by screws 28 or other suitable fastening means, to the plate 11, as shown in Fig. 1. A pin 29 passes through the shaft 25 and extends into diametrically arranged slots 30 formed in a reduced portion 31 of the member 26 to operatively connect the shaft 25 thereto. Thus by rotating the member 26, the shaft 25 and the lens mount 21 are also rotated to move the desired focal length lens 19 into projecting position. The member 26 may be operated by a knob 32, a tubular portion 33 of which overlies the end of the member 26 and is connected thereto by means of a pin 34.

After the disk 21 has been thus rotated to bring the desired projection lens 19 into operative position, it is then necessary to move the adjusted lens relative to the gate 13 and along the optical axis of the lamp 14 and condenser lenses 16 to focus the projection lens, as is apparent to those in the art. The present embodiment, however, provides an arrangement whereby the rotation of the disk 21, to bring the desired lens 19 into position, is also utilized to move the projections lens 19 along the optical axis to thus focus the lens.

To this end, the right-hand bracket 27, Fig. 2, is provided with a stationary pin 35 which projects into a helical slot 36 formed on the outer periphery of the tubular member 26, as shown in Fig. 2. By means of this arrangement, the rotation of the member 26 also moves the latter longitudinally relative to the brackets 27 to shift the disk 21 along the optical axis to focus the lens 19. The pitch of the groove 36 is such that when the disk 21 is rotated sufficiently to bring the adjacent lens 19 into position, the disk will also be moved along the optical axis a distance equal to the difference between the focal lengths of the lenses. It is evident, therefore, that the lens mount or disk 21 is both rotated to bring the desired lens 19 into position, and is also simultaneously shifted along the optical axis a distance equal to the difference in the focal lengths of the adjacent lenses so that the selected lens will be brought into focus.

As positive and negative films have the emulsion coating on opposite sides of the film base, it is apparent that if a positive film is used and the lens 19 is focused, as above described, the lens would be slightly out of focus if a negative film were subsequently used, and conversely. This difference in focus is equal to the distance between the emulsion surfaces, which is substantially equal to the film thickness. In order to adjust for this slight difference in focus, auxiliary means is preferably provided for moving the shaft 25 axially relative to and independent of the member 26. To this end, an auxiliary knob 38 is formed with a shank 39 which is journaled in a central opening 40 formed in the knob 32.

The shank 39 has a threaded portion 41 which projects into a recess 42 formed in the right end of the shaft 25, as viewed in Fig. 2. The outer end of this recess is threaded to receive the portion 41 so that upon rotation of the knob 38, the shaft 25 and lens mount 21 are moved along the optical axis relative to the tubular member 26 to bring the lens 19 into sharp focus. The pin 34 extends into a peripheral groove 43 on the portion 41 to prevent relative axial movement between the portion 41 and the tubular member 26, and cooperates with the pin 29 to operatively connect the member 26 and the shaft 25. A coil spring 44 is positioned between the end of the portion 41 and the bottom 45 of the recess 42 to take up any lost motion between the portion 41 and the shaft 23. Thus by rotating the knob 38, the shaft 25 may be moved longitudinally of the member 26 to provide a slight focusing of the various lenses 19.

As the lenses 19 of different focal length are moved into projecting position, the lens mount 21 is simultaneously moved relative to the gate 13, as above described. Obviously, both the light source 14 and the condenser lenses 16 must also be moved relative to the gate 13 a distance equal to the difference in the focal lengths of the lenses 19 to properly focus the image of the film strip in the positioned projection lens 19. To secure this result, the lamphouse 12 may be preferably and independently shifted; but it is preferred to operatively connect the lamphouse to the lens mount so that when the latter is shifted along the optical axis, in a manner above described, the lamphouse is moved as a unit therewith an amount equal to the longitudinal movement of the lens mount. To this end, the lamphouse 14 has secured thereto a pair of rods 46 which slide in bearings 47 on the plate 11, and have the ends thereof secured to the depending arms 48 of a bracket 49. This bracket is provided with a bearing 50 through which the reduced portion 31 of the member 26 extends so that the bracket 49 is supported in suspended relation by the tubular member 26. The bracket 49 is held in place against a shoulder 50 on the member 26 by means of a collar 52 which is secured to the portion 31 of the member 26 by any suitable means such, for example, as a pin 53, all as shown in Fig. 2. Thus as the member 26 is moved longitudinally by the rotation of the knob 32, the bracket 49, and hence the lamphouse 12 with its lamp 14 and also the condenser lenses assembly 16, are moved, as a unit, with the lens mount 21 to properly focus the image of the film strip in the selected projection lens 19. The bracket 49 is formed with a pair of laterally extending arms 54 the ends of which are formed with bosses 55 in which are secured the ends of rods 56 the other ends of which are slidable in bearings 57 in the right hand bracket 27, Fig. 2. Thus when the bracket 49 is moved longitudinally, the rods 56 guide the bracket 49 to maintain the latter in proper alignment, as will be apparent from an inspection of Figs. 1 and 2.

Figure 3:
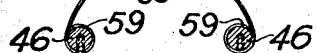
Fig. 3 is an elevation view of a portion of the the mechanism taken substantially on the line 3—3 of Fig. 2, showing the arrangement for holding the projection lens mount in adjusted position.

Means is also preferably provided to move or lock the various members in adjusted position. In the present embodiment, this lock comprises a spring member 58, of the shape best shown in Fig. 3, the ends 59 of which are wrapped around and secured to the rods 46. This spring is provided with a detent 60 which is arranged to snap into one of the notches 61 formed in the periphery of the lens mount 21, as shown in Fig. 3. The notches 61 are so positioned that when the desired projection lens 19 has been moved into projecting position, the detent 60 registers with and snaps into one of the notches 61, to resiliently hold the lens mount 21, as well as the other optical members, in adjusted position.

In the original recording of the image on the film strip, the long way of the image may be arranged either longitudinally or transversely of the strip, depending upon the article being photographed, as is well known. In order that these differently arranged images may be projected in an upright, or in the same position, on the viewing screen, the present invention provides a prism 62 by which the image may be rotated to bring the image in proper position. This prism is mounted in a prism cell 63 rotatably mounted in a central opening 64 formed in the bracket 49 concentric with the optical axis. The cell 63 has secured thereto a ring gear 65 which is connected to a gear 67 mounted on one end of the lower rod 56, Fig. 1. The other end of the rod 56 is provided with a finger knob 68 by which the rod 56, and hence, by reason of the gear train 65 and 67, the prism 62 may be rotated, for the reason above described. As the prism 62 is mounted in the bracket 49, the prism obviously moves as a unit with the lens mount and is always spaced the same distance from the positioned lens 19.

It is evident from the above description, that the rotation of the knob 32 will rotate the lens mount 21 transversely of the optical axis to bring the desired projection lens 19 into operative position. This rotation of the knob 32 also shifts the member 26, and hence moves as a unit, the lens mount 21, bracket 49 with its prism 62, the lamphouse 12 and lamp 14, and the condenser lenses 16 along the optical axis, thus automatically insuring proper focusing of the projection lens and the various optical members. Fine focusing adjustments of the lens 19 is secured by rotating the auxiliary focusing knob 38, for reasons above described, while rotation of the knob 68 will rotate the prism 62 to bring the image in the correct position on the viewing screen.

Figs. 4, 5, and 6 show a modified arrangement by which the lamphouse and the condenser lens assembly are moved as a unit with the lens and prism mounts. In this embodiment, the lamphouse, lamp and condenser lens assembly, may be of the same general arrangement as shown in Figs. 1 and 2, and therefore designated by the same numerals. Other corresponding parts are also designated by the same numerals as in Figs. 1 and 2. The lamphouse 12 is slidably mounted on and supported by a pair of cantilever rods 70 which are secured to supports 71 on the plate 11, and extend through bearings 72 formed on the side of the lamphouse 14, as clearly shown in Fig. 4.

The projection lenses 19 of different focal lengths are mounted in a lens mount 73 which is supported on a pair of rods 74 mounted in the bifurcated ends 75 of a U-shaped bracket 76. This bracket is provided with a pair of parallel longitudinally extending rods 77 which are slidably supported by bearings 78 of a bracket 79 which, in turn, is mounted on a plate 80. This plate may be a part of or separately secured to the plate 11, Figs. 1 and 2. The bracket 79 thus supports the bracket 76 and hence the lens mount 73. One of the rods 74, preferably the upper one, Fig. 5, is longitudinally slidable in the bracket 76 to shift the lens mount 73 transversely of the optical axis to bring the desired projection lens 19 into operating position. Suitable means, such as a pair of collars 74ª, may be secured to the slidable rod 74 to limit the movement thereof to properly position the lenses 19. The lens mount 73 is provided with a depending pin 81 which extends into a diagonal slot 82 formed in the cross-piece 83 of a U-shaped member 84, the side arms 85 of which are suitably secured to the sides of the condenser lens housing 17, as clearly shown in Fig. 4.

By means of this arrangement, the transverse shifting of the lens mount 73 to bring the proper projection lens 19 into position may be utilized to secure part of the necessary movement of the lamp 14 and condenser lens assembly 16 along the optical axis, as will be apparent from an inspection of the drawings. A pair of screws 86 extending through slots 87 in the side arms 85 of the U-shaped member 84 and into registering apertures in the plate 80 to guide the U-shaped member as it is slid along the plate 80. These screws 86 cooperate with the rods 70 to maintain the lamphouse and condenser lens assembly in proper alignment, as it is moved along the optical axis.

The lens mount 73 is then shifted along the optical axis by means of a rod 89 which is slidable in a bearing 90 on the bracket 79, and has the end 91 thereof threaded into a hub or boss 92 formed on the top of the bracket 76, the purpose of the threaded engagement will be later described. A spring pressed ball 93 is positioned in the bearing 90, and is arranged to be recessed in one of the grooves 94 formed in the rod 89, as shown in Fig. 5, to hold the rod 89, and hence, the lens mount 73 in longitudinally adjusted position. The grooves 94 are spaced along the rod 89 a distance equal to the difference in the focal lengths of the two projection lenses 19, so that the ball 93 will snap into one of the grooves 94 when the mount 73 has been moved along the optical axis the proper amount to focus the transversely positioned lens 19. As the lens mount is connected by the U-shaped member 84 to the lamphouse, the lamp 14 and the condenser lenses 16 will obviously also move along the optical axis as a unit with the lens mount 73 when the rod 79 is slid longitudinally, as above described.

Thus in the embodiment shown in Figs. 4 and 5, the lamp 14 and the lenses 16 are moved in two steps. First, they are moved part of the required distance when the lens mount 73 is shifted transversely to bring the desired projection lens 19 into position. The balance of the movement is then secured when the rod 89 is shifted longitudinally to move the lens mount along the optical axis. In the arrangement shown in Fig. 6, however, the slot 82ª, in the same position as the slot 82, is parallel to the rods 74 so that no movement of the lamp 14 and condenser lenses 16 is secured when the lens mount 73 is shifted transversely, as above described. In this latter construction, the entire movement of the lamp and condenser lens assembly is secured by longitudinal movement of the rod 89. Rotation of the rod 89, on the other hand, will move the lens mount 73 along the threaded portion 91 of the rod 89 to provide for a slight focusing adjustment of the lens 19, for the reasons above described.

The prism 62, with its cell 63, is rotatably mounted in a cylindrical opening 98 formed in the bracket 76. The ring gear 65 on the cell 63 is adapted to engage with a rack 99 formed on the rod 100 which is slidable in spaced U-shaped recesses 101 formed in the bottom of the bracket 76. The recesses 101 may be closed by suitable cover plates 102 secured to the bracket 76 in any well-known manner such for example, as by screws 103. Thus by moving the rod 100 transversely, the prism 62 may be rotated for the reasons pointed out above. Suitable finger knobs are provided for moving the rods 74, 89, and 100, as illustrated in Fig. 4.

Figs. 7 to 10 show still another modification by which the lamphouse and condenser lens assembly is moved as a unit with the lens and prism mounts. The lamp, lamphouse, and condenser lens assembly may be the same as above described, and are, therefore, given the same numerals. Other corresponding parts are also similarly designated. As in Figs. 4 to 6, the lamphouse 12 is slidable on rods 70, which are secured to the plate 11 or the top of the projector cabinet, and extends through bearings 72 formed on the opposite sides of the lamphouse, as shown in Fig. 7. If desired, a spring pressed ball 110, similar to 93, may be provided in each bearing 72 to engage spaced notches 111 formed in each rod 70, to hold the lamphouse 12 in adjusted position. In this embodiment, the projecting lenses 19 are mounted in lens mounts 112 and 113 which are secured to and movable with a pair of rods 114 and 115 supported in spaced bracket 116 secured to a plate 117 fastened to or integral with plate 11. The two lens mounts 112 and 113 are connected together by a web 118 so that the two mounts form, in effect, a single mount which is movable as a unit with the rods 114 and 115. These rods are spaced apart a distance equal to the difference in the focal lengths of the two projection lenses 19. The rod 114 is provided with a finger knob 119 by which the two rods 114 and 115, and the unitary lens mount may be moved transversely of the optical axis to bring the desired projection lens 19 into position. The rods 114 and 115 are provided with stop member 120 adapted to engage the brackets 116 to accurately position the lens 19 on the optical axis. As the rods 114 and 115 are spaced a distance equal to the difference in the focal lengths of the lenses 19, it is apparent that when either of the lenses is moved into position it is also automatically focused.

The bottom of this unitary lens mount is provided with a plate 121 on which is mounted a rack 122 with which a gear 123 is adapted to mesh. This gear is secured to the upper end of a shaft 124 the lower end of which carries a similar gear 125 adapted to mesh with a rack 126 formed in a slide 127 which moves in a dovetailed groove 128 formed in the plate 117, see Figs. 8 and 9. The upper end of the shaft 124 is supported in a bracket 129, while the lower end is journaled in the plate 117, as clearly illustrated in Fig. 8. Thus when the rods 114 and 115, and the unitary lens mount, are shifted transversely, the rack 122 engages the teeth of the gear 123 to rotate the latter. This rotation of gear 123 also rotates the shaft 124 and the gear 125, the latter engaging and moving the rack 126 and hence the slide 127 along the plate 117 in the direction of the optical axis. The transverse movement of the lens mount is thus translated into an axial movement of the slide 127. A suitable prism 62 and prism cell 63, above described, are rotatably mounted in an opening 130 in the slide 127 so that the latter constitutes a prism mount which is movable as a unit with the lens mount.

It is apparent, upon inspection of Fig. 7, that the distance between the center lines of the lenses 19 is greater than the distance between the center lines of the rods 114 and 115, the latter distance being equal to the difference in focal lengths of the lenses 19. As the prism mount 127 is moved longitudinally only a distance equal to the difference in focal lengths of the lens 19, while the latter must be moved transversely the distance between their center lines, means must obviously be provided for arresting further movement of the prism mount 127 when the latter has been moved the required distance, yet permitting the unitary lens mounts 112 and 113 to be further moved to bring the desired lens 19 into projecting position. To secure this result, the rack 122 is made of such length that after the prism mount 127 has been moved the required distance, the gear 123 moves out of engagement with the rack 122, thus preventing further operation of the mount 127. The transverse movement of the lens mount may, however, be continued until the desired lens 19 is brought into position.

This movement of the prism mount 127 is utilized to correspondingly move the lamphouse 12 and condenser lens housing 17. To secure this result, these members are all operatively connected so that they will move as a unit relative to the film gate 13. This connecting means comprises, in the present embodiment, a U-shaped metal strip 131, similar to 84, which is secured to the slide 127 and the sides of the housing 17, as shown in Fig. 7. When the lamphouse has been moved the required distance the spring pressed ball 110 drops into the registering notch 111 to maintain the members in adjusted position. Thus the lens mount and the various optical members are moved as a unit along the optical axis a distance equal to the difference in the focal lengths of the projection lenses 19.

As pointed out above, slight adjustments to the lenses 19 are necessary to compensate for the position of the emulsions on films of different types. This adjustment may be secured, for example, by means of gears 133 mounted on the shafts 114 and 115, and engaging racks 134 formed in milled out recesses 135 on the top of the lens mounts 112 and 113, see Figs. 7, 9, and 10. Thus when the rods 114 and 115 are rotated the lenses 19 are moved along the optical axis to secure the desired focus. Obviously the adjustment of the individual lens may be independently secured by separately rotating the rods 114 and 115. It is desired, however, to so connect the rods that the rotation of one rod will also rotate the other rod the proper relative amount, thus focusing both lenses 19 at the same time. Then either lens 19 may be shifted into position without necessitating any further adjustment.

This connecting means comprises a gear 136 mounted on the rod 114 and meshing with the gear 137 mounted on the rod 115. As the lenses 19 are of different focal length, the amount of axial adjustment for each lens obviously depends on its focal length, while the relative axial movement of the lenses depends upon their difference in focal length. However, in order for the same rotative movement of the rod 114 may impart the required relative axial movement to both lenses 19, the gear ratio of the gears 136 and 137 should be twice the difference in focal lengths of the lenses 19. For example, if one lens has a focal length which is twice that of the other, the gear ratio should be 1 to 4, as shown.

As pointed out above, the prism cell 63 is provided with a ring gear 65. This ring gear is adapted, in the present embodiment, to mesh with a rack 140 formed on the bar 141 which is slidable in bearings 142 formed on the prism mount 127, as best shown in Fig. 7. Thus by moving the bar 141 in or out, the prism 62 may be rotated to properly position the image on the viewing screen for the reasons pointed out above. A suitable finger knob 143 may be provided on the bar 141 to facilitate the movement thereof.

It is thus apparent from the above description that the present invention provides an arrangement by which one of a plurality of projection lenses of different focal lengths may be selectively moved into projecting position. It is also apparent that this positioning movement of the projection lenses may also be utilized to simultaneously shift the lens mount, prism mount, light source, and the projector lenses along the optical axis an amount equal to the difference in the focal lengths of the projection lenses. Thus when the desired projection lens is moved into position, all of the various optical members will be focused relative to the gate and to each other to insure a properly focused image on the viewing screen. Thus a single condenser lens unit may be used with a variety of projecting lenses of different focal lengths. Furthermore, the image may be rotated by means of the prism to correctly position the image on the viewing screen. While only two projection lenses have been shown in each of the above embodiments, this is by way of illustration only, as it is contemplated that any desired number of such projection lenses may be used without departing from the spirit of the invention or the scope of the appended claims.

While certain embodiments of the invention have been disclosed, it is to be understood that the inventive idea may be carried out in a number of ways. This application is, therefore, not to be limited to the precise details described, but is intended to cover all variations and modifications thereof which fall within the spirit of the invention or the scope of the appended claims.

I claim:

1. In a projecting apparatus, the combination with a base, a film gate mounted on said base, of a lamphouse having a light source positioned therein, a condenser lens assembly mounted on said lamphouse and on the optical axis of said light source, means for slidably supporting said lamp house on said base, a disk positioned on the opposite side of said gate from said lamp house, said disk having mounted thereon a plurality of projecting lenses of different focal lengths, means mounted on said base for both rotating said disk to bring one of said projecting lenses into alignment with said optical axis and for moving said aligned lens said lamp housing, and said assembly along said axis, and means for independently moving said disk along said axis relative to said housing and assembly.

2. In a projecting apparatus, the combination with a base, a film gate on said base, of a lamp house slidably mounted on said base and arranged to be moved toward and away from said gate, a light source positioned within said lamp house, a condenser lens assembly mounted on said lamp house and positioned intermediate the light source and said gate and on the optical axis thereof, a pair of spaced bearings on said base, a tubular member mounted in said bearings, a shaft positioned in said member and operatively connected thereto, a disk fastened to one end of said shaft, a plurality of projecting lenses of different local lengths carried by said disk, said tubular member being formed with a spiral groove, a pin on one of said bearings projecting into said groove whereby the rotation of said tubular member will also move said shaft and disk along said axis, a prism mount depending from and movable with said member, a prism carried by said mount, a pair of rods connecting said prism mount with said lamp house, means for rotating said tubular member to both rotate said disc to bring one of said projecting lenses into alignment with said optical axis and for simultaneously moving said disk, said prism mount, said lamp house, and lens assembly as a unit along said optical axis relative to said gate, means for rotating said shaft independently of said tubular member to move said disk along said axis relative to said prism mount, said lamp housing, and said lens assembly, a gear train connected to said prism mount, and a knob for operating said gear train to rotate said prism on said axis.

3. In a projecting apparatus, the combination with a base, a film gate mounted on said base, of a lamp house slidably mounted on said base and at one side of said gate, a light source positioned within said lamp house, a condenser lens assembly mounted on and movable with said lamp house and positioned between said lamp house and said gate and on the optical axis of said light source, a bearing positioned on said base on the opposite side of said gate, a rod movably mounted in said bearing parallel to said axis, a depending bracket carried by said rod, a second rod slidably mounted in said bracket and movable transversely of said axis, a lens mount carried by said second rod, a plurality of projecting lenses of different focal lengths carried by said lens mount, said second rod being slidable in said bracket to move said lens mount transversely of said axis to bring one of the projecting lenses into alignment therewith, a U-shaped member slidably mounted on said base and having one end thereof operatively connected to said lamp house and the other end being formed with a transverse slot, a pin depending from said lens mount and extending into said slot to operatively connect said lens mount to said lamp house and lens assembly, means for adjusting said first mentioned rod to move said lens mount, said lamp house, and said lens assembly as a unit along said axis and relative to said gate, and means on said bearing for maintaining said first mentioned rod in adjusted position.

4. In a projecting apparatus, the combination with a base, a film gate mounted on said base, of a lamp house slidably mounted on said base and at one side of said gate, a light source positioned within said lamp house, a condenser lens assembly mounted on and movable with said lamp house and positioned between said lamp house and said gate and on the optical axis of said light source, a bearing positioned on said base on the opposite side of said gate, a rod movably mounted in said bearing parallel to said axis, a depending bracket carried by said rod, a prism mounted in said bracket and positioned on said optical axis, a second rod slidably mounted on said bracket and movable transversely of said axis, a lens mount carried by said second rod, a plurality of projecting lenses of different focal lengths carried by said lens mount, said second rod being slidable in said bracket to move said lens mount transversely of said axis to bring one of the projecting lenses into alignment therewith, a U-shaped member slidably mounted on said base and having one end thereof operatively connected to said lamp house, the other end of said U-shaped member being formed with a transverse slot, a pin depending from said lens mount and extending into said slot to operatively connect said lens mount, and said prism mount to said lamp house and lens assembly, means for adjusting said first mentioned rod to move said lens mount, said prism mount, said lamp house, and said lens assembly as a unit along said axis and relative to said gate, means on said bearing for maintaining said first mentioned rod in adjusted position, auxiliary means for moving said lens and prism mounts, said lamp house, and lens assembly along said axis, and a rack and pinion for rotating said prism on said axis.

5. In a projecting apparatus, the combination with a base, a film gate mounted on said base, of a lamp house positioned on one side of said gate and slidably mounted on said base, a light source positioned within said lamp house, a condenser lens assembly secured to and movable as a unit with said lamp house and on the optical axis of said light source, a support mounted on said base on the opposite side of said gate, spaced brackets mounted on said support, substantially parallel rods mounted in said brackets and slidable therein in a direction transversely of said axis, a lens mount secured to and movable with said rods, a plurality of projecting lenses of different focal lengths carried by said lens mount, said rods being slidable in said brackets to move said lens mount transversely of said axis to bring one of said projecting lenses into alignment therewith, said projecting lenses being spaced a distance equal to the difference in their focal length so that when moved into projection position they will be in proper position relative to said gate, and means operatively connecting said lamp house to said lens mount so that said lamp house and lens mount will be moved as a unit relative to said gate.

6. In a projecting apparatus, the combination with a base, a film gate mounted on said base, of a lamp house positioned on one side of said gate and slidably mounted on said base, a light source positioned within said lamp house, a condenser lens assembly secured to and movable as a unit with said lamp house and on the optical axis of said light source, a support mounted on said base on the opposite side of said gate, spaced brackets mounted on said support, substantially parallel rods mounted in said brackets and slidable therein in a direction transversely of said axis, a lens mount secured to and movable with said rods, a plurality of projecting lenses of different focal lengths carried by said lens mount, said rods being slidable in said brackets to move said lens mount transversely of said axis to bring one of said projecting lenses into alignment therewith, said projecting lenses being spaced a distance equal to the difference in their focal length so that when moved into projection position they will be in proper position relative to said gate, a prism mount slidably mounted on said support adjacent said lens mount, means operatively connecting said lens and prism mounts so that said mounts will move as a unit, means connecting said lamp house to said prism mount so that said lamp house will move as a unit with said lens and prism mounts, and auxiliary means for moving said projecting lens in said lens mount along said axis independently of said prism mount and said lamp house.

7. In a projecting apparatus, the combination with a base, a film gate mounted on said base and aranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, means for moving said lens mount relative to said base and transversely of said axis to position one of said projecting lenses in alignment with said gate, and means for actuating said connecting means to simultaneously move said lens mount said light source and said condensing lens along said axis and a predetermined distance relative to said gate so as to be maintained in focus on said strip positioned in said gate.

8. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, means for moving said lens mount relative to said base and transversely of said axis to position one of said projecting lenses in alignment with said gate, and a single means engaging said lens mount to simultaneously move said lens mount said light source and said condensing lens as a unit along said axis and a predetermined distance relative to said gate so as to be maintained in focus on said strip positioned in said gate.

9. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, means for moving said lens mount relative to said base and transversely of said axis to position one of said projecting lenses in alignment with said gate, and a single means engaging said lens mount to simultaneously move said lens mount said light source and said condensing lens as a unit along said axis and relative to said gate a distance equal to the difference in the focal lengths of adjacent projecting lenses so as to be maintained in focus on said strip positioned in said gate.

10. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, means for moving said lens mount relative to said base and transversely of said axis to position one of said projecting lenses in alignment with said gate, a single means engaging said lens mount for simultaneously moving said mount said light source and said condensing lens as a unit along said axis and relative to said gate a distance equal to the difference in the focal lengths of adjacent projecting lenses so as to be maintained in focus on said strip positioned in said gate, and auxiliary means for moving said mount along said axis and relative to said gate.

11. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, means for moving said lens mount relative to said base and transversely of said axis to position one of said projecting lenses in alignment with said gate, means for simultaneously moving said lens mount, said light source and said condensing lens as a unit along said axis and a predetermined distance relative to said gate, and means independent of said first mentioned mount moving means for moving said mount along said axis and relative to said gate.

12. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, means for moving said lens mount relative to said base and transversely of said axis to position one of said projecting lenses in alignment with said gate, means for simultaneously moving said lens mount said light source and said condensing lens as a unit along said axis and a predetermined distance relative to said gate, and auxiliary means independent of said last mentioned means for moving said mount, said light source, and said condensing lens along said axis and relative to said gate so as to bring the strip in said gate into sharp focus.

13. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, said light source said condensing lens and said lens mount being mounted on said base for movement relative to said gate and along said axis, means supported by said base for operatively connecting said lens mount to said light source and said condensing lens, a plurality of projecting lenses of different focal lengths carried by said lens mount, and means for moving said lens mount transversely of said axis and relative to said base to bring one of said projecting lenses into alignment with said axis and for simultaneously moving said mount said light source and said condensing lens as a unit along said axis and a predetermined distance relative to said gate so as to be maintained in focus on said strip positioned in said gate.

14. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, a prism arranged adjacent said lens mount and positioned on said optical axis, said light source said condensing lens said lens mount and said prism being mounted on said base for movement relative to said gate and along said axis, means supported by said base for operatively connecting said mount to said prism said light source and said condensing lens, a plurality of projecting lenses of different focal lengths carried by said lens mount, means for moving said lens mount relative to said base and transversely of said axis to position one of said projecting lenses in alignment with said axis, and means for simultaneously moving said lens mount, said prism, said light source, and said condensing lens along said axis and a predetermined distance relative to said gate so as to be maintained in focus as the strip positioned in said gate.

15. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, a prism arranged adjacent said lens mount and positioned on said optical axis, said light source said condensing lens said lens mount and said prism being mounted on said base for movement relative to said gate and along said axis, means supported by said base for operatively connecting said mount to said prism said light source and said condensing lens, a plurality of projecting lenses of different focal lengths carried by said lens mount, means for moving said lens mount relative to said base and transversely of said axis to position one of said projecting lenses in alignment with said axis, a single means for simultaneously moving said lens mount said prism said light source and said condensing lens along said axis and a predetermined distance relative to said gate so as to be maintained in focus on the strip positioned in said gate, and means for turning said prism about said axis.

16. In a projecting apparatus, the combination with a base, a film gate mounted on said base and arranged to receive and position a film strip, of a light source postioned on one side of said gate and in alignment therewith, a condensing lens intermediate said gate and said light source and on the optical axis of the latter, a lens mount positioned on the opposite side of said gate, a prism mount carried by said base and positioned adjacent said lens mount, a prism fixed in said prism mount in alignment with said optical axis, said light source said condensing lens and said mounts being mounted on said base for movement relative to said gate and along said axis, means carried by said base for operatively connecting said lens mount to said prism mount said light source and said condensing lens, a plurality of projecting lenses of different focal lengths carried by said mount, means for moving said lens mount transversely of said axis to position one of said projecting lenses in alignment with said axis, a single means supported by said base for simultaneously moving said mounts said light source and said condensing lenses as a unit along said axis and a predetermined distance relative to said gate so as to be maintained in focus on the strip positioned in said gate, and means independent of said lens mentioned means for turning said prism about said axis.

17. In a projecting apparatus, the combination with a base, a film gate mounted on said strip and arranged to receive and position a film strip, of a light source positioned on one side of said gate and in alignment therewith, a condensing lens intermediate said gate and said light source and on the optical axis of the latter, a lens mount positioned on the opposite side of said gate, a prism mount carried by said base and positioned adjacent said lens mount, a prism fixed on said prism mount in alignment with said optical axis, said light source said condensing lens and said mounts being mounted on said base for movement relative to said gate and along said axis, means carried by said base for operatively connecting said lens mount to said prism mount said light source and said condensing lens, a plurality of projecting lenses of different focal lengths carried by said mount, means for moving said lens mount transversely of said axis to position one of said projecting lenses in alignment with said axis, a single means supported by said base for simultaneously moving said mounts said light source and said condensing lenses as a unit along said axis and a predetermined distance relative to said gate so as to be maintained in focus on the strip positioned in said gate, auxiliary means for moving said lens mount along said axis, a ring gear on said prism mount, and means engaging said gear to rotate said prism on said axis.

18. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, a prism mount carried by said base and positioned adjacent said lens mount, a prism fixed in said prism mount in alignment with said optical axis, said light source said condensing lens and said mounts being mounted on said base for movement relative to said gate and along said axis, means carried by said base for operatively connecting said lens mount to said prism mount said light source and said condensing lens, a plurality of projecting lenses of different focal lengths carried by said lens mount, means for moving said lens mount transversely of said axis to position one of said projecting lenses in alignment with said axis, a single means supported by said base for simultaneously moving said mounts said light source and said condensing lenses as a unit along said axis and a predetermined distance relative to said gate so as to be maintained in focus on the strip positioned in said gate, means independent of said last mentioned means for simultaneously moving said mounts said light source and said condensing lens as a unit along said axis and relative to said gate a distance substantially equal to the thickness of said strip to compensate for the position of the emulsion coating thereon, a gear train operatively connected to said prism mount, and means for actuating said gear train to turn said prism about said axis.

19. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, a prism mount carried by said base and positioned adjacent said lens mount, a prism fixed in said prism mount in alignment with said optical axis, said light source said condensing lens and said mounts being mounted on said base for movement relative to said gate and along said axis, means carried by said base for operatively connecting said lens mount to said prism mount said light source and said condensing lens, a plurality of projecting lenses of different focal lengths carried by said lens mount, means for moving said lens mount transversely of said optical axis to bring one of said projecting lenses into alignment therewith and for simultaneously moving both of said mounts said light source and said condensing lens as a unit along said axis and a predetermined distance relative to said gate so as to be maintained in focus on the strip positioned in said gate, and means independent of said last mentioned means for moving said lens mount along said axis and relative to said prism mount said light source and said condensing lens a distance substantially equal to the thickness of said strip to compensate for the position of the emulsion coating thereon.

20. In a projecting apparatus, the combination with a base, a film gate mounted on said base and arranged to receive and position a film strip, of a light source positioned on one side of said gate and in alignment therewith, a condensing lens intermediate said gate and said light source and on the optical axis of the latter, a lens mount positioned on the opposite side of said gate, a prism mount carried by said base and positioned adjacent said lens mount, a prism fixed in said prism mount in alignment with said optical axis, said light source said condensing lens and said mounts being mounted on said base for movement relative to said gate and along said axis, means carried by said base for operatively connecting said lens mount to said prism mount said light source and said condensing lens, a plurality of projecting lenses of different focal lengths carried by said lens mount, means for moving said lens mount transversely of said optical axis to bring one of said projecting lenses into alignment therewith and for simultaneously moving both of said mounts said light source and said condensing lens as a unit along said axis and a predetermined distance relative to said gate so as to be maintained in focus on the strip positioned in said gate, means independent of said last mentioned means for moving said lens mount along said axis and relative to said prism mount said light source and said condensing lens a distance substantially equal to the thickness of said strip to compensate for the position of the emulsion coating thereon, and means for turning said prism about said axis.

ALVIN E. SCHUBERT.